(12) United States Patent
Graham et al.

(10) Patent No.: US 8,204,957 B2
(45) Date of Patent: Jun. 19, 2012

(54) METHOD FOR FACILITATING USER OF A COMMUNICATION DEVICE TO CONTROL MULTIPLE CONCURRENT COMMUNICATION SESSIONS

(75) Inventors: David J. Graham, Gilbert, AZ (US); William P. Alberth, Crystal Lake, IL (US); Daniel J. Declerck, Lake Barrington, IL (US); William Reinisch, New York, NY (US)

(73) Assignee: Motorola Mobility, Inc., Libertyville, IL (US)

( * ) Notice: Subject to any disclaimer, the term of this patent is extended or adjusted under 35 U.S.C. 154(b) by 288 days.

(21) Appl. No.: 12/347,198

(22) Filed: Dec. 31, 2008

(65) Prior Publication Data
US 2010/0169436 A1 Jul. 1, 2010

(51) Int. Cl.
*G06F 15/16* (2006.01)
(52) U.S. Cl. ........................................ 709/217; 709/206
(58) Field of Classification Search .................. 709/204, 709/205, 206, 215, 216, 217, 227, 230; 707/200
See application file for complete search history.

(56) References Cited

U.S. PATENT DOCUMENTS
6,058,435 A 5/2000 Sassin et al.
6,212,548 B1 4/2001 DeSimone et al.
2003/0210265 A1* 11/2003 Haimberg ...................... 345/758
2004/0267527 A1* 12/2004 Creamer et al. ............... 704/235
2005/0255868 A1* 11/2005 Dehlin .......................... 455/466
2006/0052127 A1 3/2006 Wolter
2007/0118662 A1 5/2007 Vishwanathan et al.

OTHER PUBLICATIONS

Science Direct.Com, "Predictive Inferences are Represented as Hypothetical Facts", Dec. 2, 2002, 2 pages, http://www.sciencedirect.com/science/article/pii/S0749596X0300144X.
IBM, "Predictive Approach to Policing Offers Deep Insight into Crime Data", Mar. 6, 2012, 2 pages, http://www-01.ibm.com/software/analytics/spss/.

\* cited by examiner

*Primary Examiner* — Joseph Avellino
*Assistant Examiner* — Marshall McLeod

(57) ABSTRACT

A method of operating a communication device to facilitate a user to control multiple concurrent communication sessions. In operation, the communication device receives a plurality of incoming communications from a plurality of recipients, in which each recipient corresponds to at least one of the multiple concurrent communication sessions. The communication device further detects a user response from a user interface of the communication device in response to receiving the incoming communications. Next, the communication device correlates the user response with at least one of the received incoming communications or previously received communications corresponding to the recipients. Further, the communication device selects at least one of the plurality of recipients based on the correlation and sends the user response to the selected at least one of the plurality of recipients.

20 Claims, 5 Drawing Sheets

METHOD FOR FACILITATING USER OF A COMMUNICATION DEVICE TO CONTROL MULTIPLE CONCURRENT COMMUNICATION SESSIONS

FIELD OF THE DISCLOSURE

The present disclosure relates to a method for facilitating a user of a communication device to control multiple concurrent communication sessions.

BACKGROUND

Communication devices with high data transfer rates enable a user to carry-on multiple communication sessions simultaneously. Such communication sessions are made even easier with Internet Protocol (IP) based networks, and may include vocal communication, instant messaging, text messaging, online gaming, and the like. Consider a communication session in which a user has multiple text based communication sessions active simultaneously. In such cases, the user may prefer to quickly respond to each of the active communication sessions with minimal interaction. For example, in personal computer instant messaging sessions, the user may need to manually switch between multiple interfaces (e.g. select an appropriate user interface window) in order to send an instant message to each of the active instant messaging sessions. Further, the user may need to manually type in the text message for sending the instant message. However, this kind of user response system can be disruptive if the user is involved in an interactive entertainment session, such as an online gaming session, in which the user would want to maintain control of the gaming session while still trying to instant message other players in the games including others not involved in the game.

One existing solution proposes a method for responding to multimedia communications based on content analysis. In this solution, a system sorts and routes information based on an analysis of service request and skill, as in a service center scenario in which a response needs to be solicited from an individual qualified to respond to the concern or problem. In operation, when a customer submits his concern or problem to the service center, the service center analyzes the content of the submission and routes the submission to an appropriate responder based on how close the content of the submission matches the stored skill sets of the potential responders. However, this existing solution does not consider a dynamic environment in which routing of communication needs to be analyzed and controlled based on the content of a two-way conversation rather than content from a data submission and a static database.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
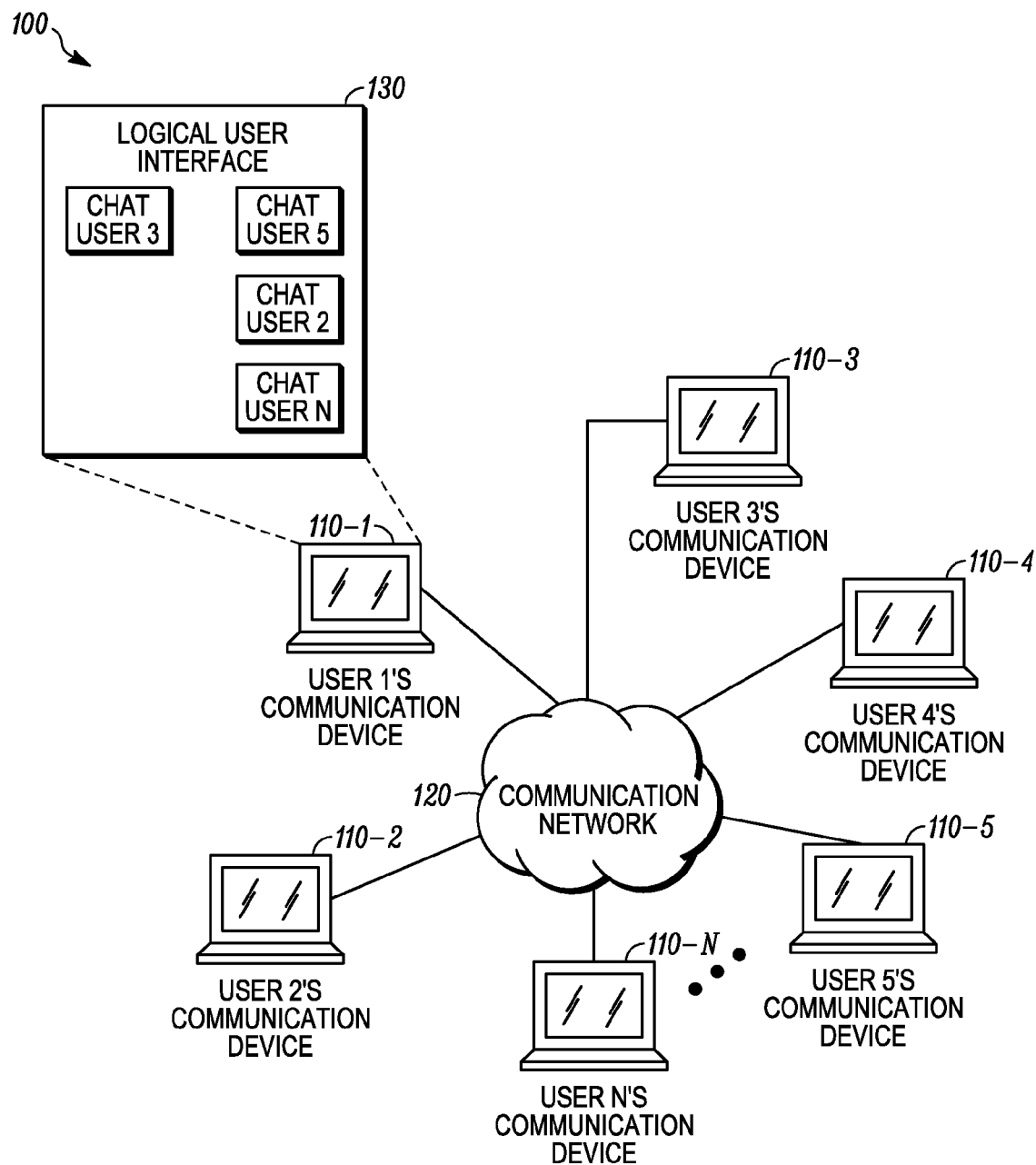
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The device and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

One aspect of the present disclosure is a communication device, and a method of operating a communication device to facilitate a user to control multiple concurrent communication sessions. The communication device comprises a receiver, a processor communicatively coupled to the receiver, and transmitter communicatively coupled to the processor. In operation, the receiver device receives a plurality of incoming communications from a plurality of recipients, in which each recipient corresponds to at least one of the multiple concurrent communication sessions. The processor detects a user response from the user of the communication device in response to the received incoming communication. The processor correlates the user response with at least one of the received incoming communications or previously received communications corresponding to the recipients, and selects at least one of the recipients based on the correlation. The transmitter then sends the user response to the selected recipients.

Another aspect of the present disclosure is another method of operating the communication device to facilitate a user to control multiple concurrent communication sessions. In operation, the communication device receives a plurality of incoming communications from a plurality of recipients, in which each recipient corresponds to one of the multiple concurrent communication sessions. Further, the communication device detects a user response in response to the received incoming communications of the plurality of recipients and determines a first contextual parameter for the detected user response. The communication device then selects an incoming communication received from one of the plurality of recipients and determines a second contextual parameter for the selected incoming communication or previously received communications corresponding to the one of the plurality of recipients. Next, the communication device determines whether the first contextual parameter corresponds to the second contextual parameter and selects the recipient in response to determining that the first contextual parameter corresponds to the second contextual parameter. The communication device then sends the detected user response to the selected recipients.

FIG. 1 illustrates a communication system 100 in which methods and devices, consistent with the embodiments of the present disclosure, are implemented. The communication system 100 includes a plurality of communication devices 110, for example, communication devices 110-1 through 110-N. Each communication device 110 may be associated with a user. The communication devices 110 are capable of communicating with each other via a communication network 120. In accordance with some embodiments, the communication network 120 employs one or more infrastructure devices (not shown) that allow the communication devices 110 to wirelessly communicate with each other. For example, the infrastructure device may be any wireless communication station (referred to as a base station or a radio base station or Node B (in 3G networks), or access point base station) installed at a fixed location of the communication system 100. In some instances, the communication devices 110 can be fixed or mobile and can communicate with each other over a wireless media with or without the support of infrastructure devices or communication network 120. The communication network 120 may include one or more of private networks, public networks, such as the Internet, wireless networks, such as satellite and cellular networks, and local area wireless networks, such as WiFi or Bluetooth networks, local area networks (LANs), wide area networks (WANs), telephone networks, such as the Public Switched Telephone Networks (PSTN), or a combination of networks.

Further, it is to be understood that the communication system 100 is only a general representation of communications among devices and, thus, may include any number of communication means and/or communication networks. In fact, the communication system 100 may include multiple, distinct networks that have no connection with one another and/or no common communication means. It is also possible for the communication devices 110 to talk to each other directly without use of infrastructure devices or networks using a so called device-to-device ad hoc or mesh connection. In this mode of operation the communication devices may form a communication network among themselves without the need for the infrastructure devices by transmitting and receiving to each other directly. A hybrid system consisting of infrastructure devices coordinated with device-to-device ad hoc connection may also be employed.

The communication devices 110 may include devices, such as mobile phones, mainframes, minicomputers, desktop computers, laptops, notebook computers, tablet personal computers (PCs), palm PCs, personal digital assistants, smart phones, set top boxes with interactive media capability, or the like. For example, in FIG. 1, the communication device 110-1 through 110-N is illustrated as a portable computer, which is often carried by its user, and thus, remains conveniently available. The communication devices 110 may transmit data over the communication network 120 or receive data from the communication network 120 via a wired, wireless, or optical connection.

In accordance with embodiments of the present disclosure, the communication system 100 facilitates users of the communication devices to control multiple concurrent communication sessions with minimal user intervention. In accordance with embodiments of the present disclosure, each communication device is capable of initiating and establishing multiple concurrent communication sessions with a respective plurality of other communication devices. To illustrate this concept, referring to FIG. 1, there is shown a logical user interface 130, for example, logical user interface 130 associated with user 1's communication device 110-1. In this example, the user 1's communication device has established communication sessions and are in active communication with user 2's communication device, user 3's communication device 110-3, user 5's communication device 110-5, and user N's communication device 110-N. As used herein, the term "active communication sessions" refers to communication sessions for which the communication device has received some incoming communications and/or the communication device is prepared to send some user response. The communication devices with which the user 1's communication device is in active communication session are referred to as "recipients."

Figure 2:
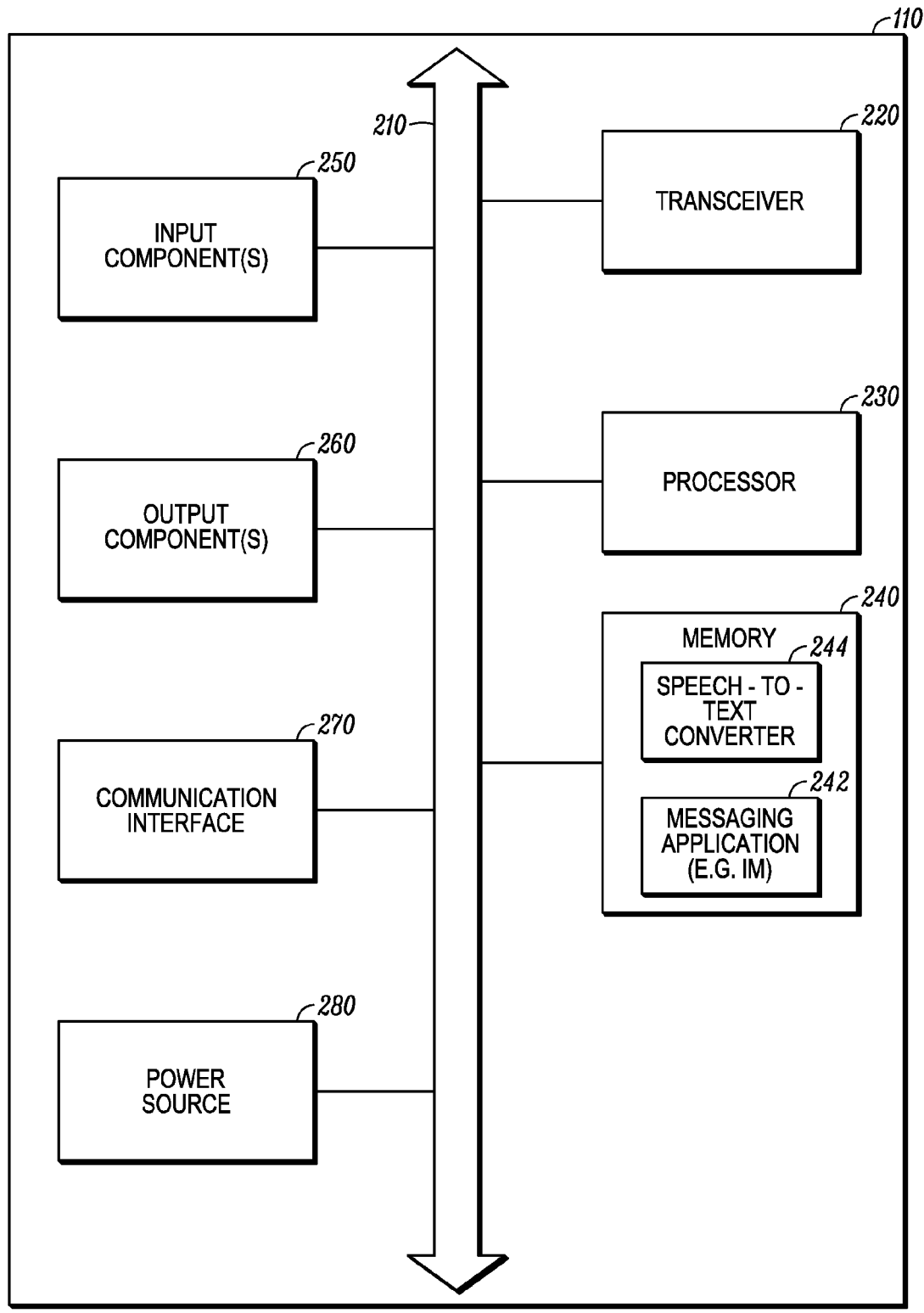
FIG. 2 is a block diagram illustrating an embodiment of a communication device employed in communication system of FIG. 1.

FIG. 2 illustrates a block diagram of a communication device 110 employed in the communication system 100 of FIG. 1. The communication device 110 includes a bus 210, one or more wired or wireless transceivers 220, a processor 230, a memory 240, one or more input components 250, one or more output components 260, a communication interface 270, and a power source 280. Each embodiment may include a user interface that comprises one or more input components 250 and one or more output components 260. The bus 210 may include one or more conventional buses that permit communication among the components of the communication device 110. The communication device 110 may include any type of conventional processor or microprocessor that interprets and executes instructions. Each transceiver 220 may be directly wired to another component or utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE or IEEE 802.16) and their variants; a peer-to-peer or ad hoc communications such as HomeRF, Bluetooth and IEEE 802.11 (a, b, g or n); and other forms of wireless communication such as infrared technology. Each transceiver 220 may be a receiver, a transmitter or both.

The input components 250 of the communication device 110 may include an audio input component such as a microphone, and a mechanical input component such as button or key selection sensors, touch pad sensor, touch screen sensor, capacitive sensor, motion sensor, and switch. For example, the user of the communication device 110 may use audio input components such as a microphone to communicate with other recipients during communication sessions. Likewise, the output components 260 of the internal components of the communication device 110 may include a variety of video, audio and/or mechanical outputs. Other examples of output components 260 include an audio output component such as a speaker, alarm and/or buzzer, and/or a mechanical output component such as vibrating or motion-based mechanisms.

The memory 240 of the communication device 110 may be used by the processor 230 to store and retrieve data. The data that may be stored by the memory 240 include, but is not limited to, operating systems, applications, and database. Each operating system includes executable code that controls basic functions of the communication, such as interaction among the components of the internal components of the communication device 110, communication with external devices via each transceiver 220, and storage and retrieval of applications and data to and from the memory 240. Each application includes executable code that utilizes an operating system to provide more specific functionality for the communication device. For example, according to some embodiments, as shown in FIG. 2, the memory 240 includes applications such as a messaging application 242 and a speech-to-text converter 244. The messaging application 242 supports real-time communication sessions between two or more communication devices 110 of the communication system 100. In accordance with some embodiments, the real-time communication sessions may include instant messaging sessions, simple voice calls, videophone sessions, email threads and online gaming sessions involving data, voice based and/or text based communication. The speech-to-text converter 244 is capable of converting voice based communication received from other communication devices into text message and providing the text message to the user of the receiving communication device 110. Further, the speech-to-text converter 244 is capable of converting voice based user responses to text to enable the communication device 110 to send the detected user response in a text format to recipients.

The communication interface 270 may use transceiver 220 to enable the communication device 110 to communicate with other devices and/or systems. For example, the communication interface 270 may include mechanisms for communicating with another device or system via a network, such as communication network 120. The communication device 110 also includes a power source 280, such as a power supply or portable battery, for providing power to other internal components of the apparatus.

In accordance with embodiments of the present disclosure, the processor 230 of a communication device 110 is configured to facilitate the user of the communication device 110 to control multiple concurrent communication sessions. The processor 230 is configured to carry out concurrent communication sessions with a plurality of recipients. In other words, the processor 230 enables the communication device 110 to establish and participate in multiple concurrent communication sessions. Further, the processor 230 is capable of detecting a user response from a user interface of the communication device, for example in response to receiving incoming communications associated with communication sessions. The processor 230 is configured to correlate the user response with at least one of the incoming communications and/or previously received communications corresponding to the recipients. Further, the processor 230 automatically selects at least one of the plurality of recipients based on the correlation for sending the detected user response to selected one of the recipients. In one embodiment, when performing the correlation process, the processor 230 may take into account the timing of the incoming communications and/or previously received communications, timing of the detected user response, identity and location of the user from whom the communication was received from, historical response rates (e.g. a boy may statistically be more likely to timely respond messages from a girlfriend), predictive text analysis identifying the context of the incoming communications and/or previously received communication and the detected user response. The text analysis may include lexical analysis of the messages presented to the user and the response to determine which message a response best fits with.

According to some embodiments of the present disclosure, the user of the communication device 110 can simply respond to any incoming communications associated with the communication sessions without providing any user input related to destination devices (recipients) for which the user desires to send the response. In this case, the processor 230 is capable of automatically capturing the user response and determining the recipients to which the detected user response needs to be sent based on correlating the user response with the incoming communications and/or previously received communications. Optionally, the processor 230 can be configured to provide a list of determined recipients to the user and wait for the user to confirm the recipients before sending the detected user response to the recipients. In addition, the processor 230 can allow the user to manually select the recipients for which the user desires to send the detected user response.

It is to be understood that FIG. 2 is provided for illustrative purposes only and for illustrating components of a communication device 110 in accordance with the present disclosure, and is not intended to be a complete schematic diagram of the various components required for a communication device 110. Therefore, a communication device 110 may include various other components not shown in FIG. 2, or may include a combination of two or more components or a division of a particular component into two or more separate components, and still be within the scope of the present disclosure.

Figure 3:
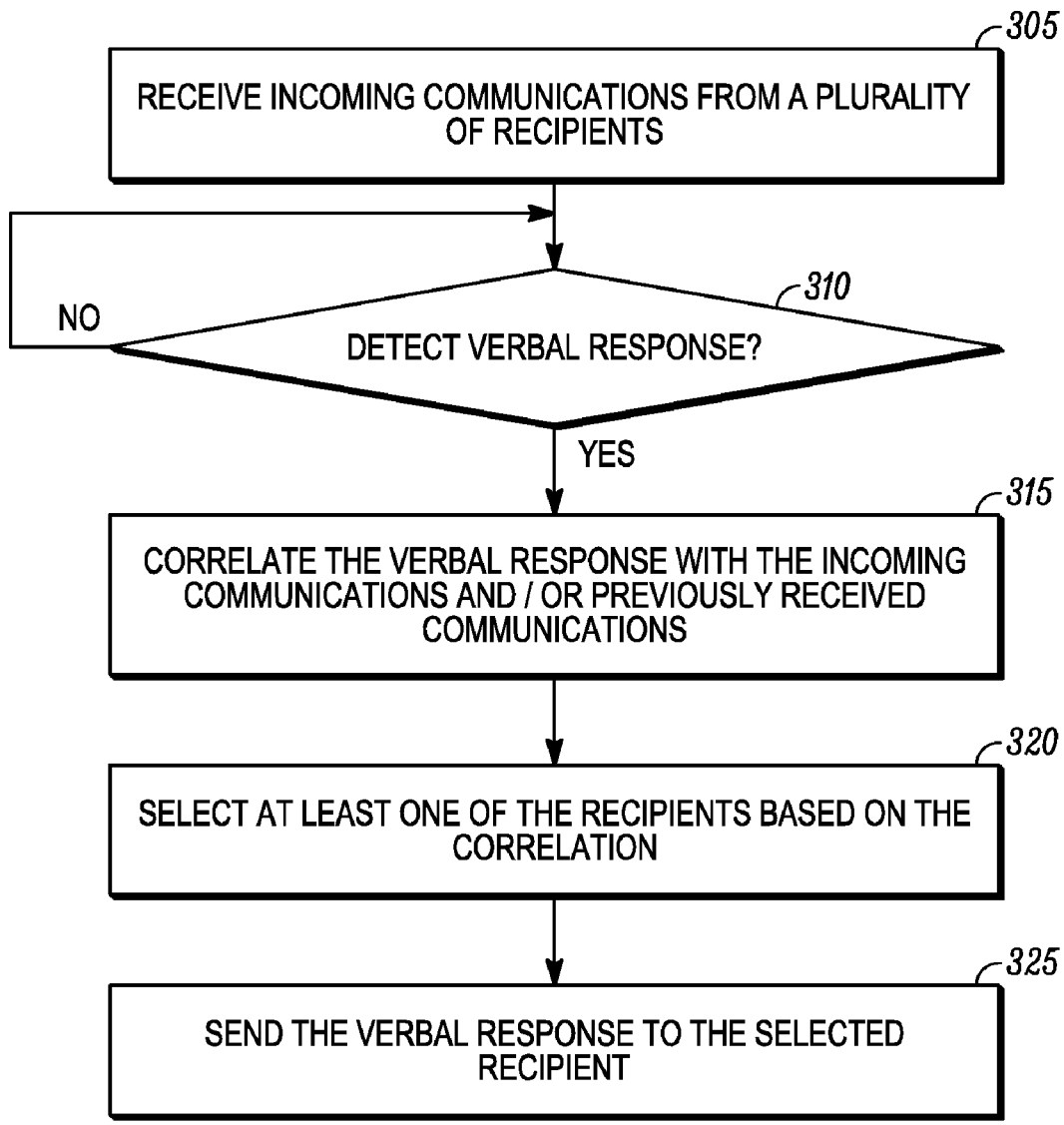
FIG. 3 is a flowchart of a method for operating a communication device for facilitating a user to control multiple concurrent communication sessions in accordance with some embodiments.

FIG. 3 is a flowchart of a method 300 for operating a communication device 110 for facilitating a user to control multiple concurrent communication sessions in accordance with some embodiments. The method 300 is initiated when the communication device 110 (e.g. communication device 110-1) establishes multiple concurrent communication sessions with one or more of other communication devices (e.g. communication devices 110-2 through 110-N, referred to as recipients). In accordance with some embodiments, the communication device 110 may store one or more of the incoming communications (referred to as previously received communications) in memory 240. At block 305, the communication device 110 receives a plurality of incoming communication sessions from a plurality of recipients. Next, at block 310, the communication device 110 waits for a predetermined time period to detect a verbal response from the user of the communication device 110 to one or more of the plurality of the incoming communications or previously received communications. In accordance with some embodiments, the verbal response from the user may be either text based response or voice based response. In accordance with some embodiments, when the communication device 110 detects a verbal response from the user, the communication device 110 defines a first set of parameters for the detected verbal response. For example, the first set of parameters defined for the detected user response is at least one of a unique identifier (user ID, name, and location) of one or more recipients, or time stamp of the detected user response, or one or more contextual text representing a context of message contained in the user response. Further, the communication device 110 defines a second set of parameters for at least one of the incoming communication of each of the recipients or previously received communications of each of the recipients. In accordance with some embodiments, the second set of parameters defined for the at least one of the incoming communications or previously received communications of the recipients is at least one of a unique identifier (user ID, name, and location) of the recipients, or time stamp of the reception of the incoming communications or the previously received communications, or one or more contextual text representing a context of message contained in the incoming communications or the previously received communications.

After detecting a verbal response from the user, the communication device 110, at block 315, correlates the verbal response with the incoming communications and/or previously received communications. In one embodiment, the communication device 110 correlates the verbal response with the incoming communications and/or previously received communications by determining whether the first set of parameters defined for the user response corresponds to the second set of parameters defined for the incoming communications or previously received communications of at least one of the recipients. Next, at block 320, the communication device 110 selects at least one of the recipients with which it has active communication session based on the correlation. In this case, the communication device 110 determines that the first set of parameters defined for the user response corresponds to the second set of parameters defined for the incoming communication and/or previously received communication of the selected at least one of the recipients. Next, at block 325, the communication device 110 sends the detected verbal response to the selected at least one of the recipients. Optionally, the communication device 110 signals the user about the selected at least one of the recipients, and receives confirmation of the selected at least one of the plurality of the recipients from the user prior to sending the user response to the selected at least one of the plurality of recipients.

Figure 4:
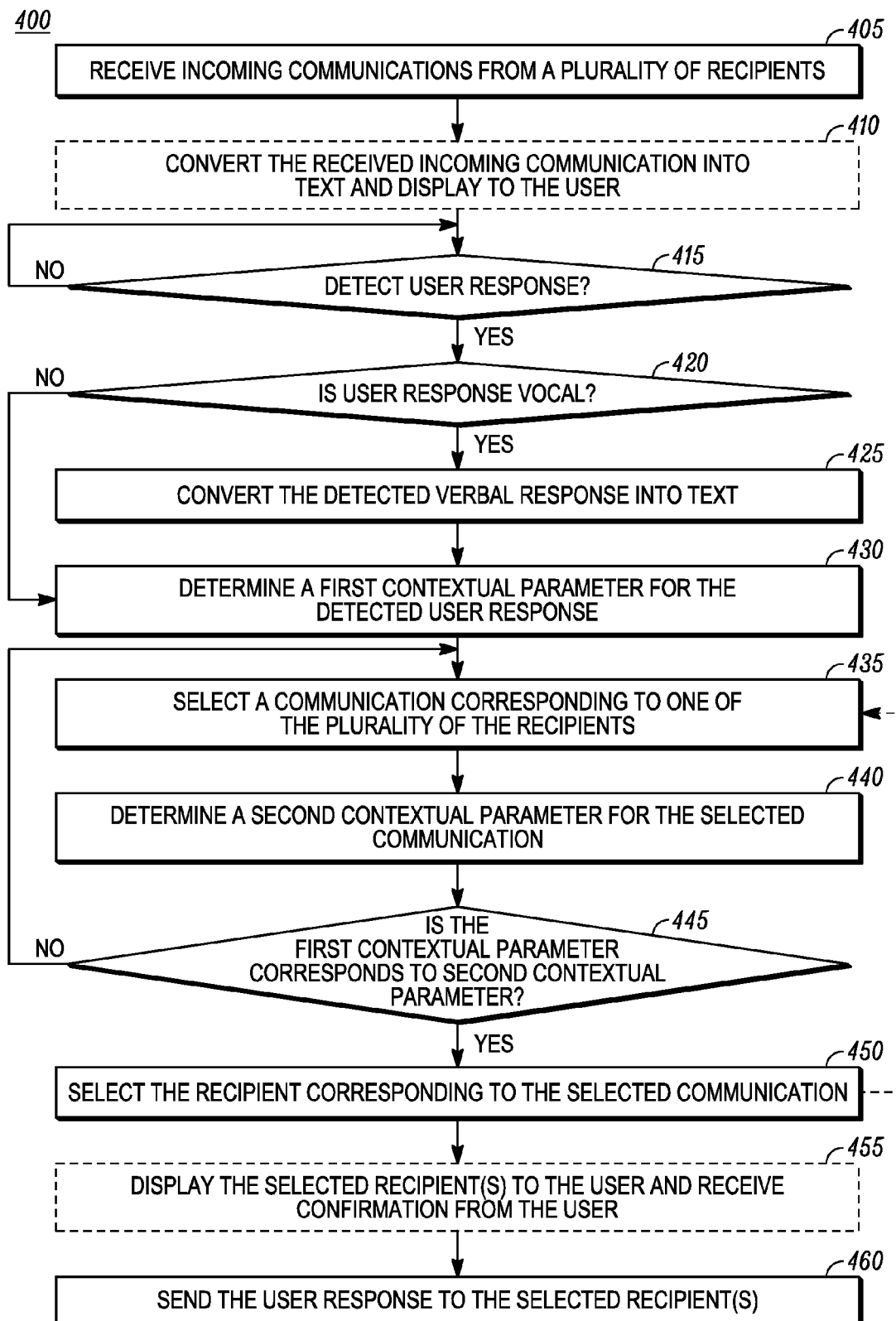
FIG. 4 is a flowchart of a method for operating a communication device for facilitating a user to control multiple concurrent communication sessions in accordance with some embodiments.

FIG. 4 is a flowchart of a method 400 for operating a communication device 110 for facilitating a user to control multiple concurrent communication sessions in accordance with some embodiments. The method 400 is initiated when the communication device 110 (e.g. communication device 110-1) establishes multiple concurrent communication sessions one or more of other communication devices (e.g. communication devices 110-2 through 110-N, referred to as recipients). In accordance with some embodiments, the communication device 110 may store one or more of the incoming communications in memory 240. At block 405, the communication device 110 receives a plurality of incoming communication sessions from a plurality of recipients. Next, at block 410, if the received incoming communications are voice based communications, then the communication device 110 may convert the received incoming communications to text and display it to the user, depending upon the preference of the user. At block 415, the communication device 110 waits for a predetermined time period to detect a user response to one or more of the plurality of the incoming communications or previously received communications. When the communication device 110 detects a user response, the communication device 110 determines if the detected user response is a voice based response as shown in block 420. If the communication device 110 determines that the detected user response is a text based response, then the communication device directly proceeds to block 430 to determine a first contextual parameter for the detected user response. On the other hand, if the communication device 110 determines that the detected user response is a voice based response, then the communication device 110 converts the detected user response into text response at block 425 and proceeds to block 430 to determine a first contextual parameter for the detected user response. In accordance with embodiments of the present disclosure, the first contextual parameter is based at least one of a unique identifier (user ID, name, and location) of one or more recipients, or time stamp of the detected user response, or one or more contextual text representing a context of a message contained in the user response.

Next, at block 435, the communication device selects a communication received from one of the plurality of recipients. In accordance with embodiments of the present disclosure, the communication may be selected either from the communications previously received from the recipients or incoming communications from the recipients. Next, at block 440, the communication device 110 determines a second contextual parameter for the selected incoming communication or previously received communications corresponding to one of the plurality of recipients. In accordance with some embodiments, the second contextual parameter is at least one of a unique identifier (user ID, name, and location) of the recipient, or time stamp of the reception of the incoming communication or the previously received communication, or one or more contextual text representing a context of a message contained in the incoming communication or the previously received communication. Next, at block 445, the communication device 110 determines whether the first contextual parameter corresponds to the second contextual parameter. If the first contextual parameter associated with the detected user response corresponds to the selected communication of one of the recipients, then the communication device 110, as shown in block 450, selects the recipient corresponding to the selected communication. Returning to block 445, if the first contextual parameter associated with the detected user response does not correspond to the selected communication of one of the recipients, then the communication device 110 returns to block 435 and selects another one of the incoming communications or previously received communications and determines if the contextual parameters match. In accordance with embodiments of the present disclosure, the communication device 110 may correlate the detected user response with each of the plurality of incoming communications and previously received communications (as indicated by dotted lines between block 450 through block 435) prior to displaying the selected recipients for sending the detected user response.

Figure 5:
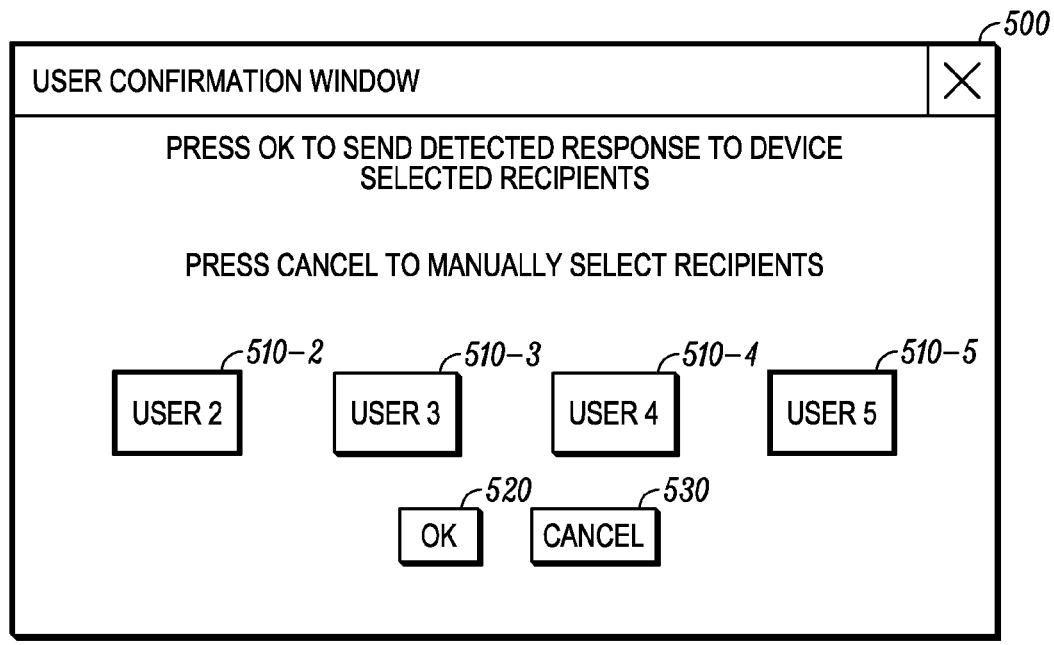
FIG. 5 illustrates an example graphical user interface implemented in the communication device that allows a user of the communication device to confirm sending of detected user response to device selected recipients.
Figure 6:
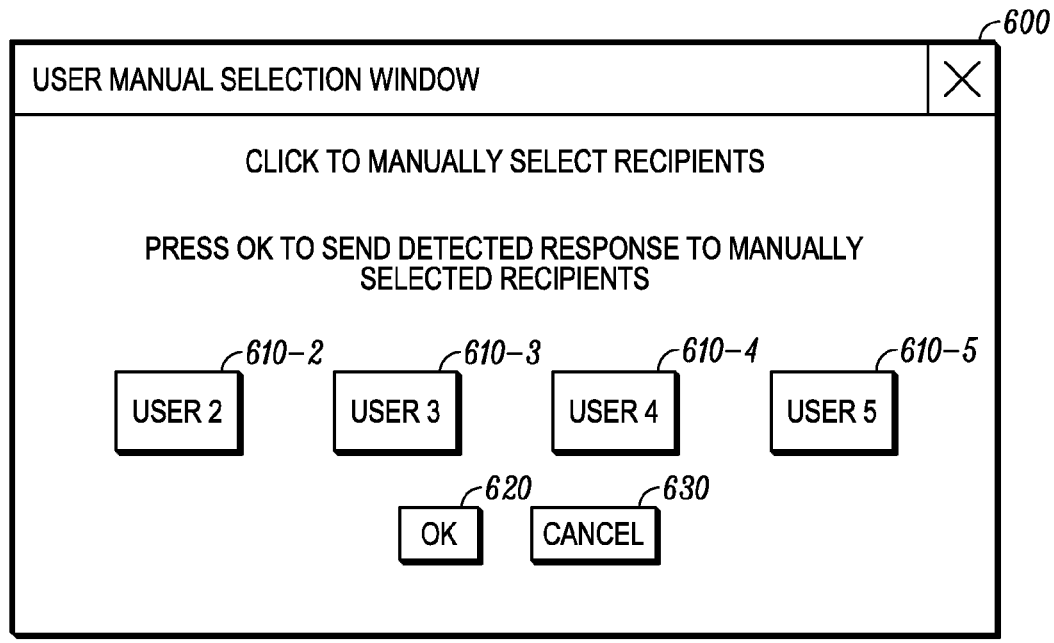
FIG. 6 illustrates an example graphical user interface implemented in the communication device that allows a user of the communication device to manually select one or more recipients for sending the detected user response to the manually selected recipients.

Next, at block 455, the communication device 110 displays the selected recipient(s) and receives confirmation of the device selected recipients from the user (see FIG. 5). In accordance with some embodiments, the communication device 110 allows the user to manually select recipient(s) from a list of recipients (see FIG. 6). The communication device 110 then sends the user response to either the device selected recipients or manually selected recipients as shown in block 460. The above method 400 may be repeated for each of the incoming communications or previously received communications, such that the communication device can detect a user response to one or more communications and automatically select recipients from a plurality of recipients for the purpose of sending the detected user response to the recipients with minimal user intervention.

FIG. 5 illustrates an example graphical user interface 500 implemented in the communication device 110 that allows a user of the communication device 110 to confirm the device selected recipients prior to sending the detected user response to the recipients. Consider that the user of a communication device 110-1 is in active communication with users 2 through 5. In other words, the communication device 110-1 has received a plurality of incoming communications from recipients, namely user 2's communication device through user 5's communication device. Each such active recipients (user 2 510-2 through user 5 510-5) is displayed to the user of the communication device 110-1 via the graphical user interface 500 (also referred to as user confirmation window 500). When the communication device 110-1 detects a user response to the incoming communications from recipients 510-2 through 510-5. The communication device, in accordance with embodiments described above, automatically selects one or more recipients from the list of active recipients 510-2 through 510-5, and highlights the selected recipients to the user. In this example, the communication device 110 has automatically selected recipients user 2 510-2 and user 5 510-5 based on the correlation process. Further, the communication device 110 allows the user to either confirm the device selected recipients or manually select one or more recipients from the list of active recipients for sending the detected user response. In this example, the graphical user interface 500 provides an "OK" button 520 that allows the user to confirm the device selected recipients by clicking the "OK" button 520. The user can also vocally confirm the device selected recipients. The communication device 110 sends the detected user response to the device selected recipients when the communication device 110 either detects that the user has clicked the "OK" button or received a vocal input from the user confirming the device selected recipients. Optionally, the detected response may be part of the prompting on the display screen, allowing the user to see the message that will be sent.

On the other hand, if the user clicks the "CANCEL" button 530, then the communication device 110, in one embodiment, displays another graphical user interface, a user manual selection window 600 that shows the list of recipients (user 2 610-2 through user 5 610-5) with which the user (user 1) of the communication device 110-1 has received a plurality of incoming communications recently. The user can click one or more recipients from the list of active recipients (user 2 610-2 through 610-5) and manually select the recipient(s) for which the user intends to send the response detected by the communication device 110. The user manual selection window 600 further provides an "OK" button 620 that the user can click after manually selecting one or more recipients. Also, the communication device 110 allows the user to vocally select one or more recipients. When the communication device 110 either detects that the user has clicked the "OK button 620 or received vocal input on selection of one or more recipients, the communication device 110 sends the detected user response to the user selected recipients. The user manual selection window 600 further provides a "CANCEL" button 630 that the user can click to return to the user confirmation window 500.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a communication device to facilitate a user to control multiple concurrent communication sessions, the method comprising:

at the communication device:

receiving a plurality of incoming communications from a plurality of recipients, each recipient corresponding to at least one of the multiple concurrent communication sessions that are active;

detecting a user response from a user interface of the communication device in response to receiving the incoming communications;

correlating the user response with one or more contextual text representing a context of message of the received plurality of incoming communications corresponding to the recipients;

selecting at least one of the plurality of recipients based on the correlation; and sending the user response to the selected at least one of the plurality of recipients.

2. The method of claim 1, further comprising determining whether the user response is a vocal response, and converting the user response into text when the user response is the vocal response.

3. The method of claim 2, wherein sending the user response comprises sending the text of the user response to the selected one of the plurality of recipients.

4. The method of claim 1, further comprising converting the received incoming communications into text and displaying the converted text to the user.

5. The method of claim 1, wherein correlating the user response with the received incoming communications comprises:

defining a first set of parameters for the detected user response;

defining a second set of parameters for the incoming communication of each of the recipients ;

determining whether the first set of parameters defined for the user response corresponds to the second set of parameters defined for the incoming communication of at least one of the recipients.

6. The method of claim 5, wherein the first set of parameters defined for the user response is at least one of a unique identifier of one or more recipients, or time stamp of the detected user response, or one or more contextual text representing a context of message contained in the user response.

7. The method of claim 5, wherein the second set of parameters defined for the incoming communications of the recipient is at least one of a unique identifier of the recipient, or time stamp of the reception of the incoming communications, or one or more contextual text representing a context of message contained in the incoming communications.

8. The method of claim 5, wherein selecting at least one of the plurality of recipients based on the correlation comprises determining that the first set of parameters defined for the user response corresponds to the second set of parameters defined for the incoming communication of the at least one of the recipients.

9. The method of claim 1, further comprising signaling the user about the selected at least one of the plurality of recipients, and receiving confirmation of the selected at least one of the plurality of the recipients from the user prior to sending the user response to the selected at least one of the plurality of recipients.

10. A method of operating a communication device to facilitate a user to control multiple concurrent communication sessions, the method comprising:

at the communication device:

receiving a plurality of incoming communications from a plurality of recipients, each recipient corresponding to one of the multiple concurrent communication sessions that are active;

detecting a user response in response to the received incoming communications of the plurality of recipients;

determining a first contextual parameter for the detected user response;

selecting an incoming communication received from one of the plurality of recipients;

determining a second contextual parameter of one or more contextual text representing a context of message of the selected incoming communication corresponding to the one of the plurality of recipients;

determining whether the first contextual parameter corresponds to the second contextual parameter;

selecting the one of the plurality of recipients in response to determining that the first contextual parameter corresponds to the second contextual parameter; and sending the user response to the selected one of the recipients.

11. The method of claim 10, further comprising:

selecting the incoming communication received from another one of the plurality of recipients; and repeating the steps of determining the second contextual parameter, comparing the first contextual parameter with the second contextual parameter, selecting another one of the plurality of recipients, and sending the user response to the selected one of the recipients till the incoming communications of each of the plurality of recipients is selected.

12. The method of claim 10, wherein determining whether the first contextual parameter corresponds to the second contextual parameter comprises determining whether one or more contextual text associated with the first contextual parameter matches with one or more contextual text associated with the second contextual parameter.

13. The method of claim 10, wherein the first contextual parameter is at least one of a unique identifier of one or more recipients, or time stamp of the detected user response, or one or more contextual text representing a context of a message contained in the user response.

14. The method of claim 10, wherein the second contextual parameter is at least one of a unique identifier of the recipient, or time stamp of the reception of the incoming communication or the previously received communication, or one or more contextual text representing a context of a message contained in the incoming communication or the previously received communication.

15. The method of claim 10, further comprising determining whether the user response is a vocal response, and converting the user response into text when the user response is the vocal response.

16. The method of claim 10, further comprising
signaling the user about the selected one of the recipients, and
receiving confirmation of the selected one of the recipients from the user prior to sending the user response to the selected one of the recipients.

17. A communication device for facilitating a user to control multiple concurrent communication sessions, comprising
a receiver configured to receive a plurality of incoming communications from a plurality of recipients, each recipient corresponding to at least one of the multiple concurrent communication sessions that are active;
a processor communicatively coupled to the receiver, the processor configured to detect a user response from the user of the communication device in response to the received incoming communications, correlate the user response with one or more contextual text representing a context of message of the received incoming communications corresponding to the recipients, and select at least one of the plurality of recipients based on the correlation; and
a transmitter communicatively coupled to the processor, the transmitter configured to send the user response to the selected at least one of the plurality of the recipients.

18. The communication device of claim 17, wherein the processor is further configured to
define a first set of parameters for the detected user response;
define a second set of parameters for the incoming communications of each of the recipients;
determine that the first set of parameters defined for the user response corresponds to the second set of parameters defined for the incoming communication of at least one of the recipients prior to selecting the at least one of the plurality of recipients.

19. The communication device of claim 18, wherein the first set of parameters defined for the user response is at least one of a unique identifier of one or more recipients, or time stamp of the detected user response, or one or more contextual text representing a context of a message contained in the user response.

20. The communication device of claim 18, wherein the second set of parameters defined for the incoming communication of the recipient is at least one of a unique identifier of the recipient, or time stamp of the reception of the incoming communication, or one or more contextual text representing a context of a message contained in the incoming communication.

\* \* \* \* \*